US012638354B2

(12) United States Patent
Sangermano et al.

(10) Patent No.: US 12,638,354 B2
(45) Date of Patent: May 26, 2026

(54) COMBINATION PRESSURE AND TEMPERATURE SENSOR

(71) Applicant: SENSATA TECHNOLOGIES, INC., Attleboro, MA (US)

(72) Inventors: Michael Joseph Sangermano, Providence, RI (US); Robert T. Ballerstedt, North Attleborough, MA (US); Carolina Camejo, Bellingham, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 220 days.

(21) Appl. No.: 18/551,563

(22) PCT Filed: Mar. 24, 2021

(86) PCT No.: PCT/US2021/023892
§ 371 (c)(1),
(2) Date: Sep. 20, 2023

(87) PCT Pub. No.: WO2022/203667
PCT Pub. Date: Sep. 29, 2022

(65) Prior Publication Data
US 2024/0175775 A1 May 30, 2024

(51) Int. Cl.
*G01L 19/00* (2006.01)
*G01K 7/22* (2006.01)
*G01L 9/04* (2006.01)

(52) U.S. Cl.
CPC ............ *G01L 19/0092* (2013.01); *G01K 7/22* (2013.01); *G01L 9/04* (2013.01); *G01L 19/0038* (2013.01)

(58) Field of Classification Search
None
See application file for complete search history.

(56) References Cited

U.S. PATENT DOCUMENTS 6,267,010 B1   7/2001   Hatanaka et al.
6,543,293 B1   4/2003   Kurtz et al.
(Continued)

FOREIGN PATENT DOCUMENTS

DE   102019208013 A1 * 12/2020   ........... G01L 19/143
EP      2950070 A1   12/2015
WO   2019232930 A1   12/2019

OTHER PUBLICATIONS

International Search Report and Written Opinion issued in related International Application No. PCT/US2021/023892 on Jun. 28, 2021.

(Continued)

*Primary Examiner* — Eric S. McCall
*Assistant Examiner* — Nigel H Plumb
(74) *Attorney, Agent, or Firm* — Mark H. Whittenberger; Holland & Knight LLP

(57) ABSTRACT

A pressure and temperature sensor is provided. The sensor may include a pressure port configured to receive a media, wherein the pressure port includes at least one thermistor. The sensor may further include a body having a header and a sense element configured to seal the body from the media in the pressure port. The header and the sense element may define a space accessible to the media and the header may further include a media receiver configured to allow the media to pass between the pressure port and the space. The header may also include at least one pin in electrical communication with the thermistor and a pin receiver configured to accept the at least one pin. The at least one pin may be operatively connected to the pin receiver.

20 Claims, 10 Drawing Sheets

(56)    References Cited

U.S. PATENT DOCUMENTS

| 7,464,600 B2 | 12/2008 | Kurtz et al. |
| 7,478,560 B2 | 1/2009 | Kuznia et al. |
| 9,939,340 B2 | 4/2018 | Novellani et al. |
| 2002/0029639 A1 | 3/2002 | Wagner et al. |
| 2007/0013014 A1* | 1/2007 | Guo .................... G01L 19/0609 |
| | | 257/419 |

OTHER PUBLICATIONS

Extended European Search Report issued in related Application Serial No. 21933438.0 on Nov. 15, 2024.

European Search Report issued in related Application Serial No. 21933438.0 on Jan. 29, 2026.

\* cited by examiner

700

748 710

722

750 724

746

1000

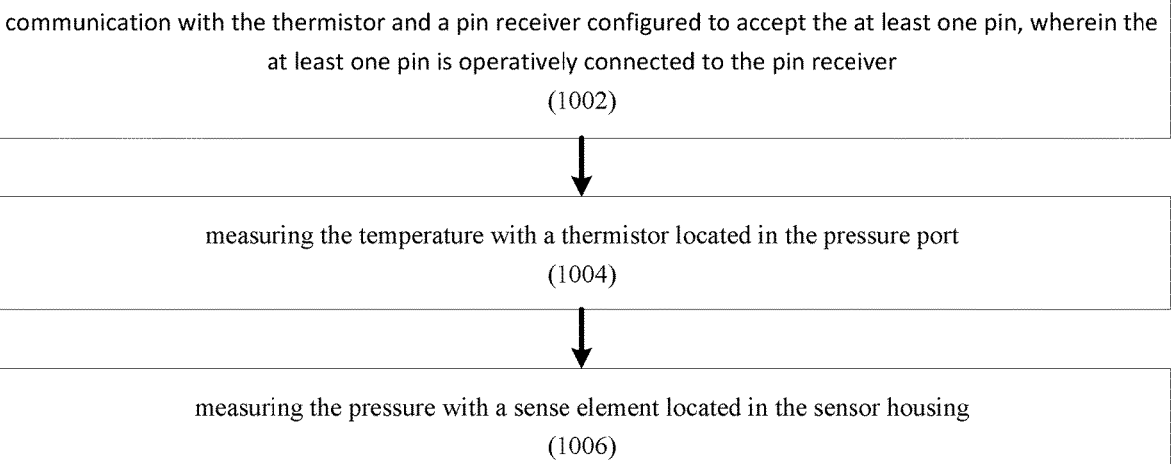

engaging a sensor housing with a component having media flowing included therein, the sensor housing including a pressure port configured to receive the media and at least one thermistor, the sensor housing further including a body having a header and a sense element configured to seal the body from the media in the pressure port, wherein the header and the sense element define a space accessible to the media, wherein the header further includes a media receiver configured to allow the media to pass between the pressure port and the space, wherein the header further includes at least one pin in electrical communication with the thermistor and a pin receiver configured to accept the at least one pin, wherein the at least one pin is operatively connected to the pin receiver
(1002)

measuring the temperature with a thermistor located in the pressure port
(1004)

measuring the pressure with a sense element located in the sensor housing
(1006)

FIG. 10

COMBINATION PRESSURE AND TEMPERATURE SENSOR

RELATED APPLICATIONS

The subject application is a U.S. National Stage application of International Application No. PCT/US2021/023892, filed on 24 Mar. 2021. The content of which is herein incorporated by reference in its entirety.

BACKGROUND

Pressure and temperature sensors are an invaluable source of information when working with fluids and may provide near real-time pressure and temperature data for operators working in numerous applications. The fluid being measured may be referred to as the media which, may include liquids, gases, and other mixtures capable of flowing (e.g., slurries, etc.). These sensors should be designed to withstand the conditions of the application, while still providing reliable, accurate readings and a long lifespan.

SUMMARY OF THE DISCLOSURE

In one or more embodiments of the present disclosure a pressure and temperature sensor is included. The sensor may include a pressure port configured to receive a media, wherein the pressure port includes at least one thermistor. The sensor may further include a body having a header and a sense element configured to seal the body from the media in the pressure port. The header and the sense element may define a space accessible to the media and the header may further include a media receiver configured to allow the media to pass between the pressure port and the space. The header may also include at least one pin in electrical communication with the thermistor and a pin receiver configured to accept the at least one pin. The at least one pin may be operatively connected to the pin receiver.

One or more of the following features may be included. In some embodiments the sense element may include a first elastomer in contact with the header, and in some embodiments, the first elastomer may be compressed. The header may be at least one of a metal and a ceramic. The at least one pin seal may be operatively connected to the pin receiver using a glass pin seal. The glass pin seal may be impenetrable by the media. The glass pin seal may be configured to allow an electrical signal to pass from the thermistor through the pin into the body of the sensor housing. In other embodiments, the sensor may include one or more alignment components. The one or more alignment components may be configured to align the header and the sense element within the sensor housing. The one or more alignment components may be located in the pressure port. The one or more alignment components may be compressed inside the pressure port. The one or more alignment components and a second elastomer may be configured to seal the body from the media. The one or more alignment components may be a plastic. The header and the pressure port may be welded together. The weld may be configured to seal the body from the media. In some embodiments, the sense element may be a micro-fused strain gauge (MSG) sense element. The MSG sense element may be attached to the header. The MSG sense element may be mounted to a metal tube, and the metal tube may be welded to the header. The MSG sense element may be mounted to a 1-piece header and tube combination. In other embodiments, the sense element may a microelectromechanical system (MEMS) sense element. The MEMS sense element may be mounted to a glass pedestal and the glass pedestal may be mounted to the header. The sensor may include a plurality of the pins connected to the header by the glass pin seal in the pin receiver. Each pin of the plurality of the pins may be separated by the glass pin seal in the pin receiver. The header may include a second header configured to fit within a second header receiver in the header, the second header may include the pin and the glass pin seal.

In one or more embodiments of the present disclosure, a method associated with a pressure and temperature sensor is included. The method may include engaging a sensor housing with a component having media included therein, the sensor housing including a pressure port configured to receive the media and at least one thermistor, the sensor housing further including a body having a header and a sense element configured to seal the body from the media in the pressure port, wherein the header and the sense element define a space accessible to the media, wherein the header further includes a media receiver configured to allow the media to pass between the pressure port and the space, wherein the header further includes at least one pin in electrical communication with the thermistor and a pin receiver configured to accept the at least one pin, wherein the at least one pin is operatively connected to the pin receiver. The method may further include measuring an associated temperature with the thermistor and measuring an associated pressure with the sense element.

One or more of the following features may be included. The sensor housing may further include one or more alignment components. The one or more alignment components may be configured to align the header and the sense element within the sensor housing.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

FIG. 10 illustrates a flowchart depicting a method of measurement with a pressure and temperature sensor consistent with embodiments of the present disclosure.

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Figure 1:
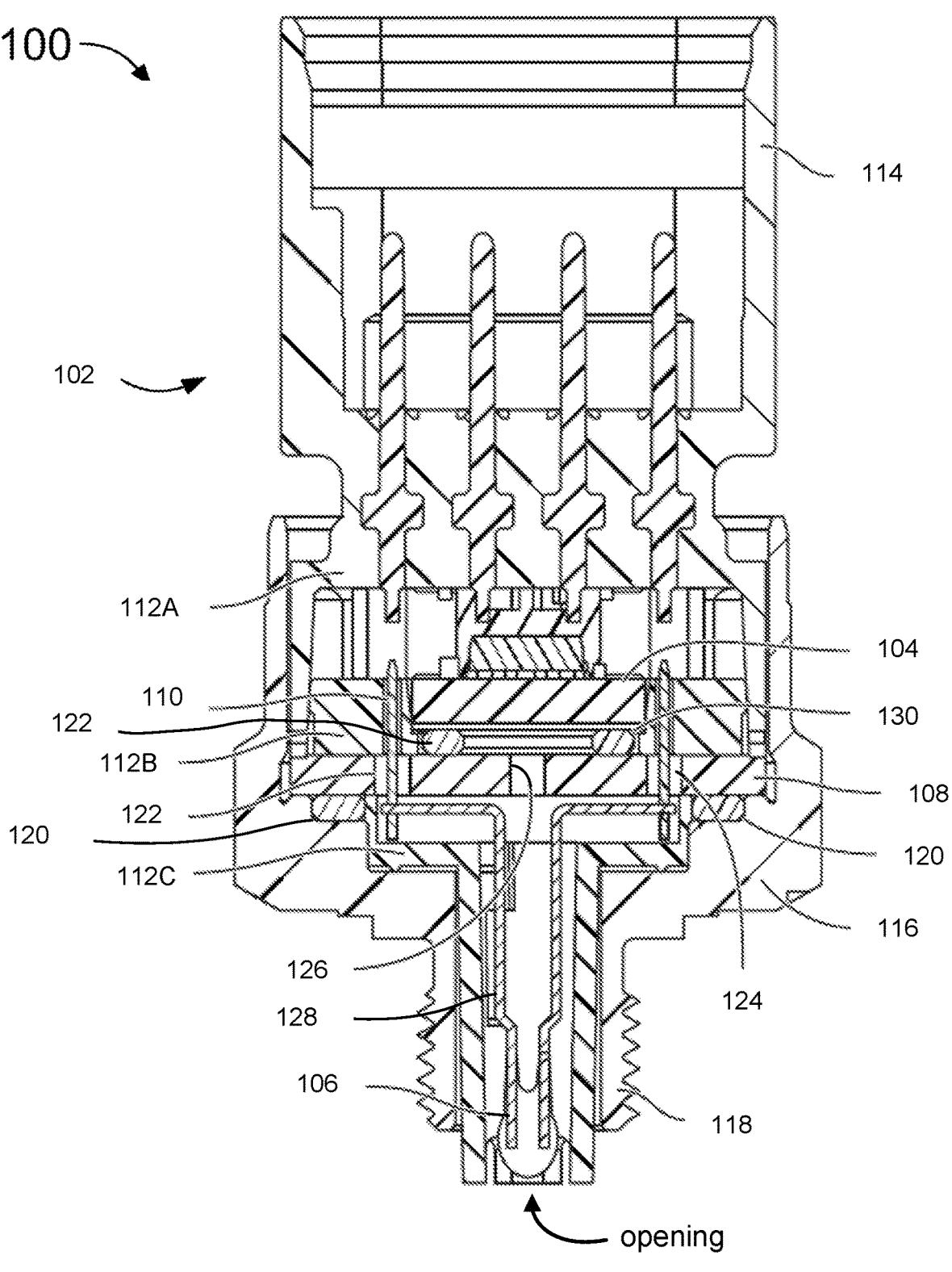
FIG. 1 illustrates a cross-sectional view of a pressure and temperature sensor consistent with embodiments of the present disclosure.

Referring now to FIG. 1, a cross-sectional view of a pressure and temperature sensor 100 consistent with embodiments of the present disclosure is provided. Pressure and temperature sensor 100 may include a sensor housing 102, a sense element 104, a thermistor 106, a header 108, a pin 110, and one or more alignment components 112A-C.

In some embodiments, sensor housing 102 may be configured to protect the internal components. Sensor housing 102 may protect the internal components (e.g. sense element 104, thermistor 106, etc.) from the media (e.g. liquids, gases, and other mixtures capable of flowing), from ambient conditions, and external forces (e.g. a falling object). Sensor housing 102 may include a body 114 and a pressure port 116. Body 114 and pressure port 116 may be configured to be attachable. Pressure port 116 may overlap body 114 to enclose and protect the internal components. For example, pressure port 116 may have walls that extend over the walls of body 114. In other embodiments, body 114 and pressure port 116 may be different sections of one piece and/or more than one piece permanently affixed together. For example, sensor housing 102 may include body 114 and pressure port 116 welded together. Sensor housing 102 may include more components than body 114 and pressure port 116. Sensor housing 102 may include, a component configured to allow mounting sensor housing 102. In some embodiments, pressure port 116 may include the component configured to allow for mounting sensor housing 102. Many examples of in the component configured to allow for mounting sensor housing 102 are possible and may include, but are not limited to at least one of, a threaded portion 118, a flange (not pictured), a clip (not pictured), a bracket (not pictured), etc. For example, threaded portion 118 may be configured to screw into a host device. Examples of a host device include, but are not limited to, a refrigeration system. In some embodiments, sensor housing 102 may include different geometries consistent with embodiments of the present disclosure.

In some embodiments, pressure port 116 may be configured to allow for the media (e.g. liquids, gases, and other mixtures capable of flowing) to enter sensor housing 102 to interact with the sense element 104. Pressure port 116 may include an opening where the media may enter sensor housing 102. The media may enter or exit sections of sensor housing 102 due to a difference in pressure between the application conditions and the pressure of sections of the sensor housing 102 accessible to the media. In some embodiments, pressure port 116 may be configured to provide support to constrain the internal components from unintentional motion. Pressure port 116 may be configured to seal the body 114 from the media. Accordingly, pressure port 116 may include an elastomer 120 configured to seal pressure port 116 from the body 114, and thereby prevent the media from entering the body 114. In some embodiments, elastomer 120 may be compressed between pressure port 116 and header 108. Pressure port 116 may be welded to header 108. In this way, the weld may be configured to seal body 114 from the media. Pressure port 116 may be a metal.

In some embodiments, sensor housing 102 may include header 108. In some embodiments, header 108 may include a pin receiver 122, a glass pin seal 124, and a media receiver 126. The term "receiver", as used herein, may refer to an edge, or series of edges, associated with a header (e.g. header 108) that define an opening in the header. In some embodiments, sensor housing 102 may include a plurality of headers 108. Header 108 may be made from at least one of a metal and a ceramic. Pin receiver 122 may be configured to allow pin 110 to pass through header 108. In some embodiments, pin receiver 122 may include an edge of header 108. For example, pin receiver 122 may include an edge of header 108 that defines an opening in header 108. The opening defined by pin receiver 122 may be shaped as a cylinder, a prism (e.g. a rectangular prism), a tube, etc. In further embodiments, pin receiver 122 may be may attached to header 108 and/or be affixed to header 108. For example pin receiver 122 may include a pipe, a connector, a conduit etc. Pin receiver 122 may be located on header 108 in any suitable location. In some embodiments, header 108 may include a plurality of pin receivers 122.

In some embodiments, pin receiver 122 may include a glass pin seal 124 configured to bond to pin 110. Glass pin seal 124 may also be configured to bond to pin receiver 122. Accordingly, pin 110 may be operatively connected to pin receiver 122 using glass pin seal 124. In some embodiments, glass pin seal 124 may create a bond by adhesion. In other embodiments, glass pin seal 124 may create a bond by compression, i.e. glass pin seal 124 squeezing on pin 110 and pin receiver 122. Accordingly, the bond created by glass pin seal 124 may be a media tight bond. Glass pin seal 124 may fill the opening defined by pin receiver 122, specifically the opening defined by the edge of header 108 included in pin receiver 122. Accordingly, pin 110 may be sealed to header 108 by pin receiver 122. In this way, glass pin seal 124 may fill the opening defined by pin receiver 122 with a glass, thereby creating a glass connection. Glass pin seal 124 may be a hermetic seal. In some embodiments, glass pin seal 124 may form a glass to metal seal. For example, glass pin seal 124 may form a glass to metal seal with pin 110 and form a glass to metal seal with pin receiver 122, which may include the edge of header 108. In some embodiments, glass pin seal 124 may be flush with the surface of header 108. Glass pin seal 124 may prevent the media from entering body 114 through pin receiver 122. Glass pin seal 124 may insulate the electrical signal in pin 110 from header 108.

In some embodiments, where header 108 is made from a ceramic, glass pin seal 124 may not be utilized to create a bond configured to prevents media from passing from one side of header 108 to the other side. Accordingly, pin 110 may be operatively connected to pin receiver 122. In this way, pin 110 may be in direct contact for the entire length of the edge of header 108 included in pin receiver 122.

As stated above, pressure and temperature sensor 100 may include thermistor 106. In some embodiments, thermistor 106 may be located in pressure port 116 and may be in contact with the media. Thermistor 106 may include a lead 128 connected to pin 110. Other configurations of pins and leads may be used in various embodiments. For example, a plurality of leads 128 may be connected to pin 110. In other embodiments, each pin 110 of a plurality of pins 110 may be connected to different leads 128 of a plurality of leads 128. In some embodiments, lead 128 may also be, but is not limited to, a wire, a cable, a conductive connector, etc. Lead 128 may include a bend configured to contact pin 110. In some embodiments, lead 128 may include a 90 degree bend. Lead 128 may be configured to allow for electrical communication between thermistor 106 and pin 110. Glass pin seal 124 may allow for the electrical signal to pass from thermistor 106 to pin 110 and thus allow the electrical signal to enter body 114 from pressure port 116, while not allowing for leakage of the media into body 114. Thermistor 106 may include a resistive signal based on the temperature of the media. In some embodiments, other types of temperature sensors may be used, for example but not limited to, a resistance temperature detector (RTD), a thermocouple, and a semiconductor based integrated circuit.

In some embodiments, media receiver 126 may be configured to allow the media to pass through pressure port 116 to sense element 104. For example, media receiver 126 may include an edge of header 108 defining an opening within header 108. In some embodiments, the edge of header 108 defining the opening within header 108 included in media receiver 126 may be near the center of header 108. Media receiver 126 may define the edge of header 108, and therefore define the opening, as a cylinder. In other embodiments, media receiver 126 may define the edge of the header to be shaped as a prism (e.g. a rectangular prism), a plurality of prisms, a plurality of cylinders, a tube etc. In further embodiments, media receiver 126 may be attached to header 108 and/or may be affixed to header 108, for example media receiver 126 may include a nozzle, a pipe, a connector, a conduit etc. Media receiver 126 may be located on header 108 in any suitable location.

In some embodiments, sense element 104 may be positioned on the opposite side of header 108 from the opening of pressure port 116. In some embodiments, sense element 104 may be positioned to seal a space adjacent to media receiver 126 (see also FIG. 2). The space may be defined by header 108 and sense element 104. The media may flow into pressure port 116 into media receiver 126 then into the space. The space may be sealed to prevent the media from entering body 114. Sense element 104 may be sealed to header 108 with an elastomer 130. Elastomer 130 may be positioned adjacent to header 108. Elastomer 130 may be compressed between sense element 104 and header 108. In some embodiments that include elastomer 130, the space may be defined by header 108, sense element 104, and elastomer 130. Accordingly, elastomer 130 may be shaped as an o-ring and/or other compatible shapes configured to seal header 108 and sense element 104.

In some embodiments, sense element 104 may be a capacitive sensing element type sense element. Sense element 104 may be configured to measure pressure. In some embodiments, sense element 104 of pressure and temperature sensor 100 may be configured as an automotive pressure sensor. However, this application is provide only as an example and other configurations are contemplated by this disclosure. Additional embodiments of sense element 104 and additional embodiments of connections between sense element 104 and header 108 are further described in reference to FIGS. 8-9.

In some embodiments, alignment component 112 may be included in sensor housing 102. In other embodiments, a plurality of alignment components 112 may be located in sensor housing 102. Alignment component 112 may be configured to align the different components within sensor housing 102. For example, alignment component 112 may has a specific shape configured to accept a specific components within sensor housing 102. Alignment component 112 may be configured to secure the different components within sensor housing 102. For example, alignment component may be configured to secure and align header 108 and sense element 104. Alignment component 112 may improve the seal between pressure port 116 and body 114. In some embodiments, alignment component 112 may be made from a plastic. Alignment component 112 may be compressed inside pressure port 116. Pressure port 116 may constrain and seal sensor housing 102.

Figure 2:
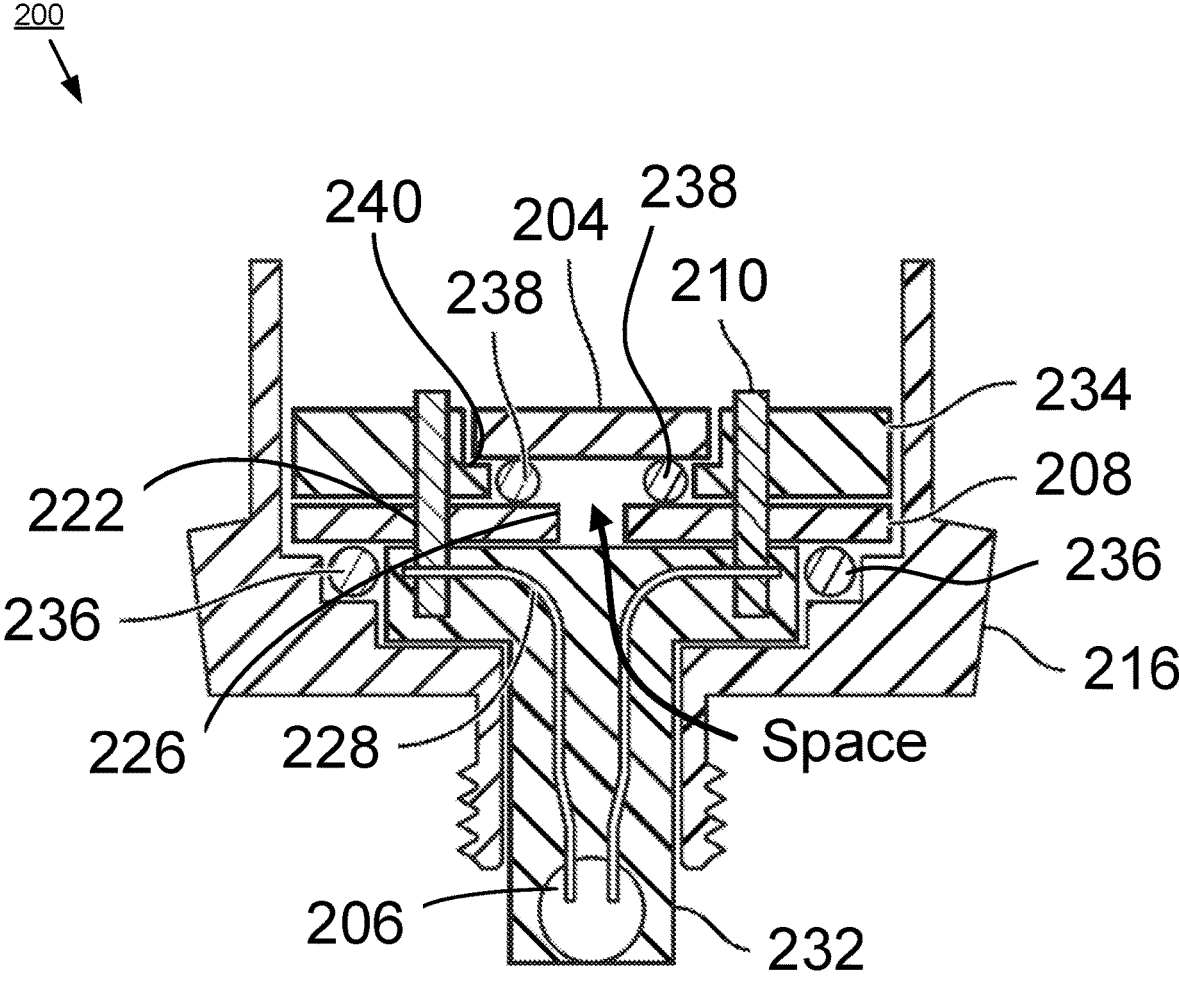
FIG. 2 illustrates a cross-sectional view of a pressure port section of a pressure and temperature sensor consistent with embodiments of the present disclosure.

Referring now to FIG. 2, a cross-sectional view of a pressure port section of a pressure and temperature sensor 200 consistent with embodiments of the present disclosure is provided. The cross-sectional view of the pressure port section includes a pressure port 216, a thermistor alignment component 232, a sense element alignment component 234, a thermistor 206, a sense element 204, a first o-ring 236, a second o-ring 238, a header 208, a media receiver 226, a pin receiver 222, and a pin 210.

In some embodiments, pressure port 216 may be configured as a hexport. In embodiments where pressure port 216 is configured as a hexport, pressure port 216 may include a hexagonal-shaped outer body.

In some embodiments, pressure port 216 may be configured to align and/or secure the alignment components (e.g. thermistor alignment component 232 and sense element alignment component 234). Accordingly, pressure port 216 may be configured to align and/or secure first o-ring 236 between thermistor alignment component 232 and header 208. In some embodiments, pressure port 216 may be configured to align and/or secure sense element alignment component 234, sense element 204, and second o-ring 238.

In other embodiments, pressure port 216 may be configured to align and/or secure sense element alignment component 234, sense element 204, second o-ring 238, pin 210, thermistor 230, and thermistor alignment component 232.

In some embodiments, alignment components (e.g. thermistor alignment component 232 and sense element alignment component 234) may provide protection to components contained within the alignment component. For example, in some embodiments, thermistor alignment component 232 may protect thermistor 206 and the connection point between pin 210 and thermistor 206. Thermistor alignment component 232 may be shaped, in some embodiments, as a cylinder affixed to a second cylinder with a larger diameter. The face of the second cylinder, i.e. the portion thermistor alignment component 232 adjacent to header 208, may be open and thus configured to allow the media access to media receiver 226. Thermistor alignment component 232 may be hollow. In some embodiments, thermistor alignment component 232 may be mated to header 208. In some embodiments, sense element alignment component 234 may be shaped as a cylinder with another cylinder removed from the center.

In some embodiments, sense element alignment component 234 may have a step 240. For example, step 240 may be located within the inner cylinder configured to allow sense element 204 to rest above second o-ring 238. In other embodiments, step 240 may include, but is not limited to, a recess, an indentation, a cutout, etc. (not shown). In some embodiments, second o-ring 238 may have a smaller diameter than sense element 204 and may be located in sense element alignment component 234 below the step configured for sense element 204.

In some embodiments thermistor 206 may be, at least in part, contained within thermistor alignment component 232. Thermistor 206 may include a bend in the one or more leads 228 in electrical communication with pin 210. In some embodiments, there may be two leads 228 that make 90 degree bends. In embodiments with at least two leads 228, each lead 228 may bend in opposite directions. The bend in the one or more leads 228 may be configured to allow the one or more leads 228 to mate with pin 210. Accordingly, thermistor 206 may be in electrical communication with pin 210. Thermistor 206 may be removably or permanently affixed to pin 210.

In some embodiments, sense element 204 may be a capacitive sensing element (CSE). Sense element 204 may be, for example, a circular-shaped CSE and/or a rectangular-shaped CSE. Sense element 204 may be shaped as three-dimensional shape for example, but is not limited to, a cylinder, a hexahedron, a prism, etc. The three-dimensional shape may include at least one flat surface. In some embodiments, sense element 204 may be configured to securely fit within sense element alignment component 234. In this way, sense element 204 may be configured to form a seal with header 208. In other embodiments, sense element 204 may be configured to form a seal with header 208 and second o-ring 238. In embodiments with second o-ring 238, sense element 204 may be configured to compress second o-ring 238.

In further embodiments, sense element 204 may be a microelectromechanical system (MEMS) style sense element. In other embodiments, sense element 204 may be a micro-fused strain gauge (MSG) style sense element. In further embodiments, sense element 204 may be a SENSATA™ Capacitive Sense Element sense element. (SENSATA is a registered trademark of SENSATA TECHNOLO- GIES, INC. in the United States, other countries or both.) In some embodiments, sense element 204 may be affixed to header 208.

In some embodiments, first o-ring 236 may be configured to fit into pressure port 216. In some embodiments, second o-ring 238 may be configured to fit into sense element alignment component 234. Accordingly first o-ring 236 and/or second o-ring 238 may be circular. However, in other embodiments first o-ring 236 and/or second o-ring 238 may have a specific geometry configured to create a media-tight seal in their respective locations. First o-ring 236 and/or second o-ring 238 may be made from at least one of an elastomer, a metal, a ceramic, etc.

In some embodiments, header 208 may be configured to fit inside pressure port 216. Header 208 may be made from, for example but is not limited to, at least one of a metal, a ceramic, etc. As previously mentioned, header 208 may be configured to allow pin 210 to pass from one side of header 208 to the other. For example, header 208 may include pin receiver 222, where pin receiver 222 is configured to accept pin 210 and seal pin 210 to prevent media passage through pin receiver 222. In some embodiments, header 208 may include two pin receivers 222 and one media receiver 226. Media receiver 226 may be located on the header 208 to be in-line with the sense element 204. Pin receiver 222 may be located on the header 208 so pin 210 may extend from header 208 without obstruction from sense element 204. Pin 210 may be sealed to header 208 by a glass seal (not shown). In some embodiments, pin receiver 222 is located on header 208 closer to the pressure port 216 than second o-ring 238.

In some embodiments, header 208, sense element 204, first o-ring 236, and second o-ring 238 may seal pressure port 216 and prevent the media from entering the body of the sensor housing (e.g. body 114). For example header 208, sense element 204, first o-ring 236, and second o-ring 238 may all be configured to withstand the pressure of the media. In some embodiments, header 208 may be shaped as a cylinder. For example, a cylindrical header may have an outer diameter of approximately 21 mm and a thickness of approximately 2 mm. However, headers with various shapes and sizes can be utilized in embodiments contemplated by this disclosure.

Figure 3:
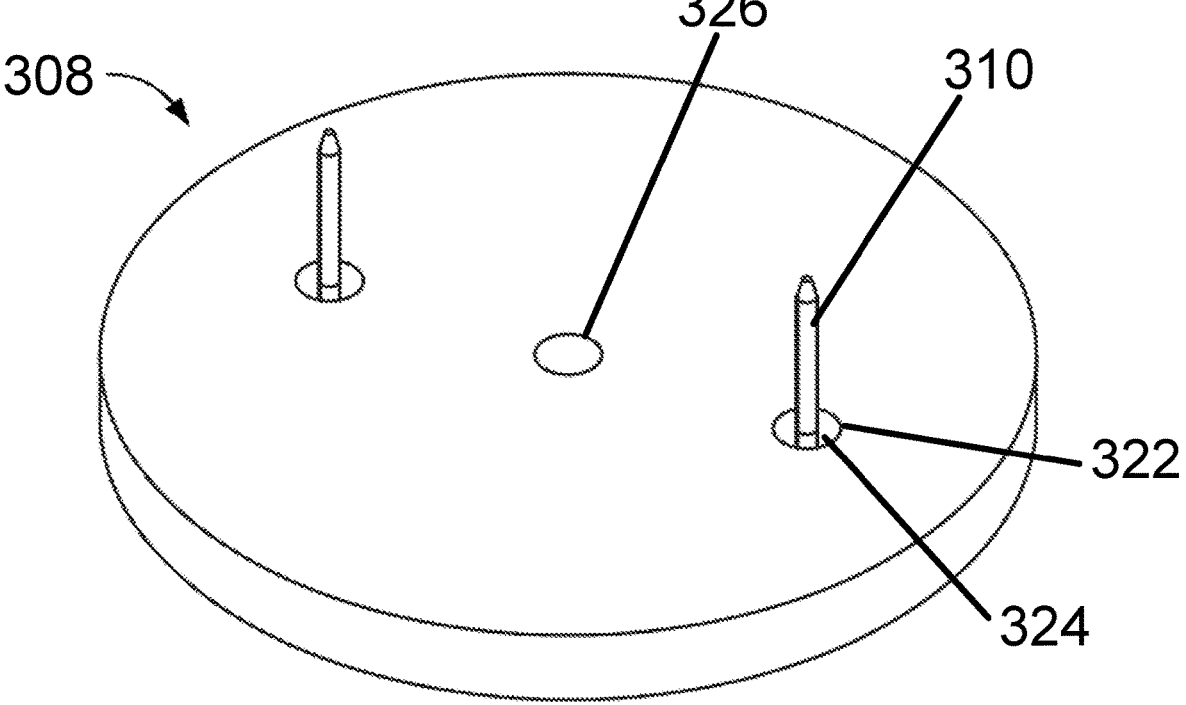
FIG. 3 illustrates a header consistent with embodiments of the present disclosure.

Referring now to FIG. 3, an embodiment of a header 308 is provided. Header 308 is depicted as an isometric embodiment. Header 308 may include a media receiver 326, a pin receiver 322, and a glass pin seal 324. In some embodiments, header 308 may be configured to have different orientations of media receiver 326, and pin receiver 322 and may include one or more media receivers 326 and/or one or more pin receivers 322. A pin 310 may be affixed to pin receiver 322 by glass pin seal 324 and therefore affixed to header 308. Media receiver 326 may be a cylindrical opening.

Header 308 may be shaped as a disk or a cylinder and may include a height smaller than its diameter. In other embodiments, header 308 may be shaped to match the internal dimensions of the sensor housing. Header 308 may be made from a material configured to withstand the pressure effects of media. Header 308 may be made from any suitable material, including, but not limited to, metal, ceramic, etc.

Figure 4:
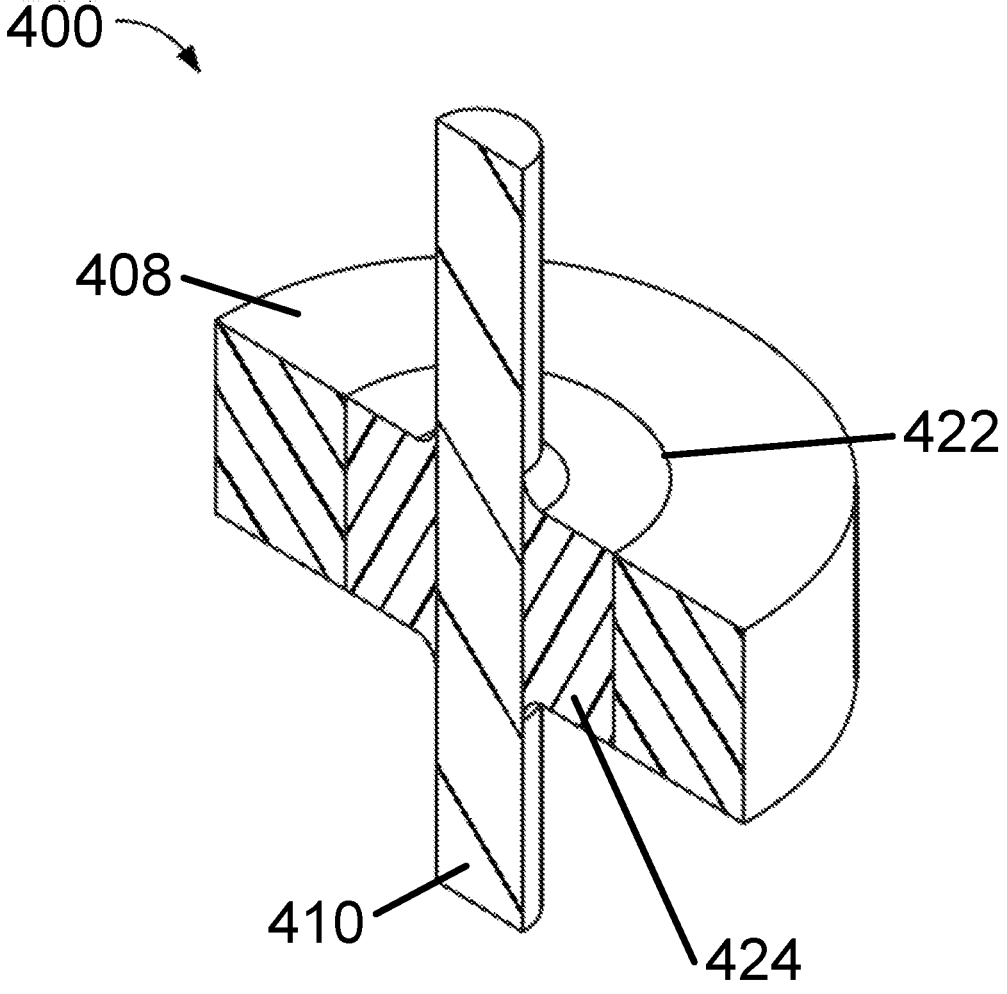
FIG. 4 illustrates a cutaway view of a glass pin seal consistent with embodiments of the present disclosure.

Referring now to FIG. 4, an embodiment 400 showing a cutaway view of a glass pin seal consistent with embodiments of the present disclosure is provided. A section of a header 408 includes a pin receiver 422, a glass pin seal 424, and a pin 410. Pin receiver 422 may include an edge of header 408 defining an opening. For example, the opening depicted in FIG. 4, and defined by the edge of header 408, is shaped as a cylinder, however, in other embodiments, the opening may be shaped as needed, such as for example a prism. For example, pin receiver 422 may include a recess in the edge of header 408 (not shown). Pin receiver 422 may be configured to allow pin 410 to pass through the section of header 408. Pin receiver 422 may have a greater diameter than pin 410. In some embodiments, pin 410 may be made from a conductive material, such as for example a metal.

In some embodiments, glass pin seal 424 may be configured to seal pin 410 to pin receiver 422 and thereby seal pin 410 to header 408. Glass pin seal 424 may surround, at least a portion of pin 410. Glass pin seal 424 may align and secure pin 410 to pin receiver 422. In some embodiments glass pin seal 424 may electrically insulate pin 410 from pin receiver 422 and header 408.

Figure 5:
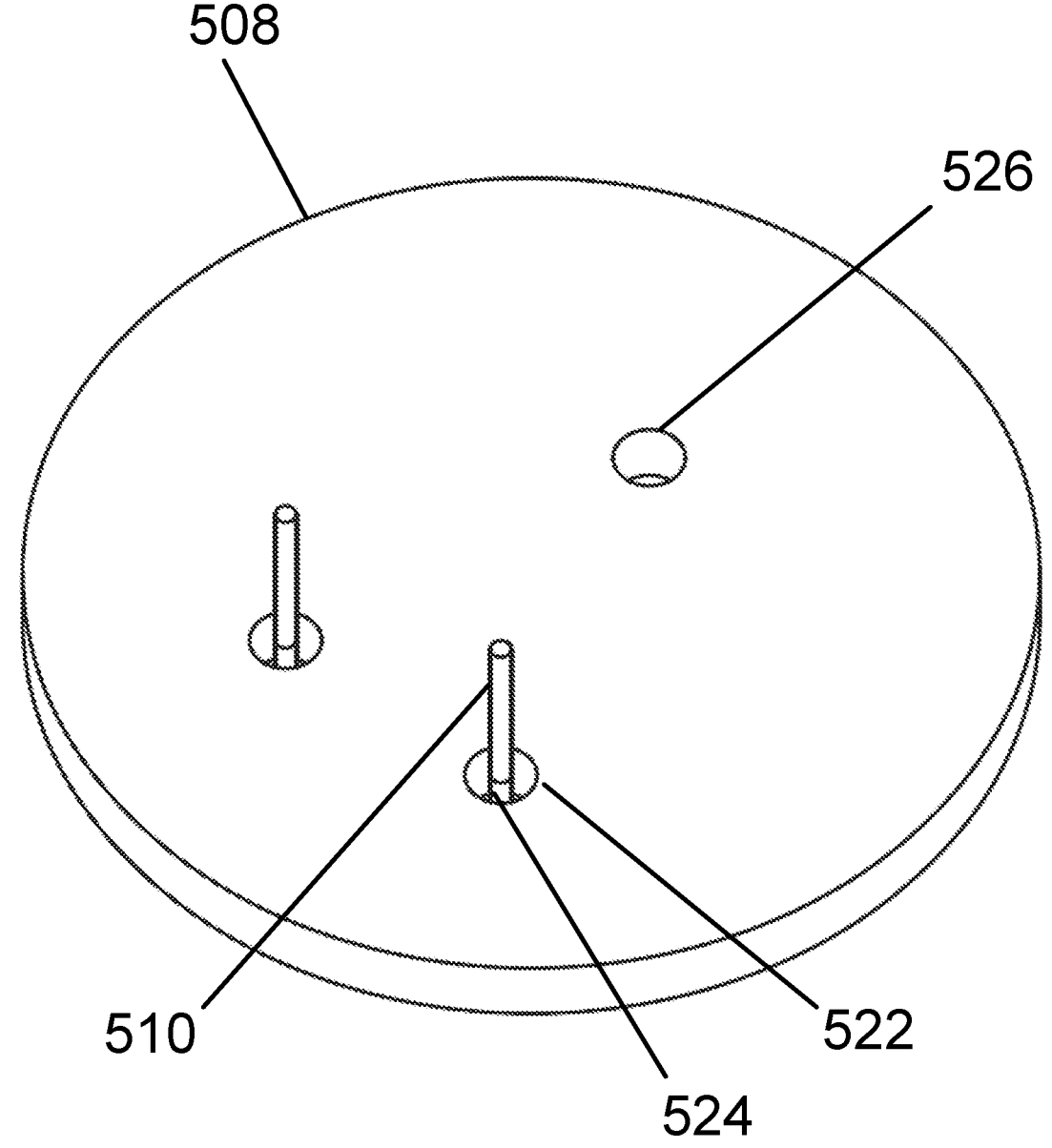
FIG. 5 illustrates a header consistent with embodiments of the present disclosure.

Referring now to FIG. 5, a header 508 consistent with embodiments of the present disclosure is provided. Header 508 is depicted having an asymmetric layout with regard to a line of symmetry running along the diameter of header 508 between a media receiver 526 and a pin receiver 522. Specifically, in the embodiment shown, media receiver 526 is located on an opposite side of the two pin receivers 522 on header 508. Header 508 may include one or more pin receivers 522. Pin receiver 522 may include a glass pin seal 524 affixed to a pin 510. Pin receiver 522 may include an edge of header 508 defining an opening, and the opening may be filled with glass pin seal 524.

Figure 6:
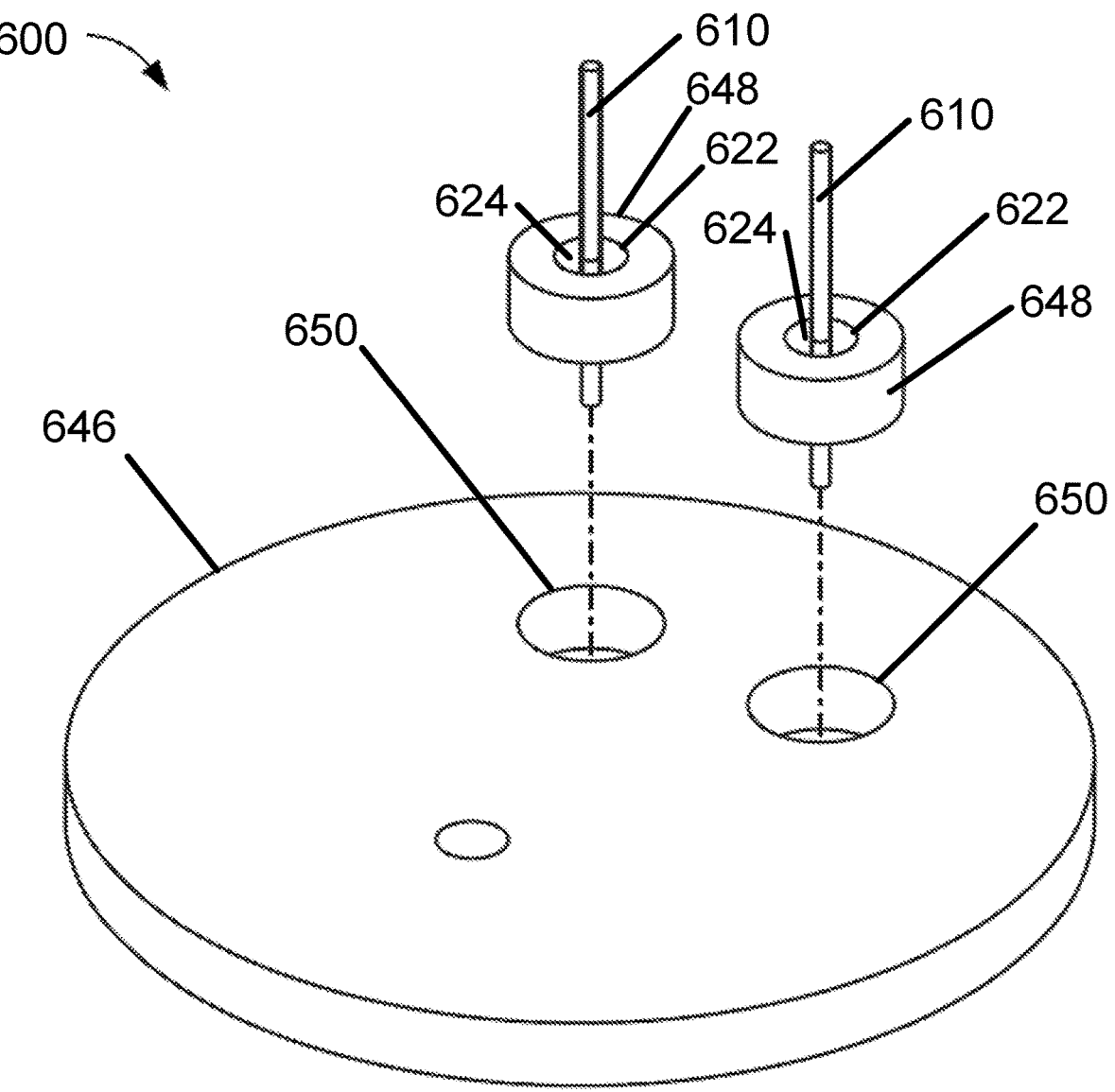
FIG. 6 illustrates a header assembly consistent with embodiments of the present disclosure.

Referring now to FIG. 6, a header assembly 600 consistent with embodiments of the present disclosure is provided. Header assembly 600 may include a first header 646, and a second header 648. First header 646 is depicted as a cylinder in header assembly 600, however in other embodiments first header 646 may be shaped to correspond with the internal dimensions of the sensor housing. In some embodiments, header assembly 600 may include a plurality of second headers 648. Second header 648 may include a pin receiver 622, a glass pin seal 624, and a pin 610. Pin receiver 622 may be configured to affix pin 610 to second header 648 via glass pin seal 624.

In some embodiments, second header 648 may be configured to directly contact first header 646. In other embodiments, second header 648 may include an o-ring or other component configured to seal second header 648 to first header 646. Second header 648 may be configured to create a seal with first header 646 thereby preventing the media from entering the body of the sensor housing.

For example, first header 646 may include a second header receiver 650. Second header receiver 650 may include an edge of first header 646. In some embodiments, first header 646 may include a plurality of second header receivers 650. Second header 648 and second header receiver 650 may be sealed together to prevent the media from passing through header assembly 620. In this way, second header 648 may be configured to fit within second header receiver 650. Second header 648 may be sealed to second header receiver 650 with glass pin seal 624. In some embodiments, second header 648 may be larger than second header receiver 650 and may be sealed with, for example, an o-ring. Other examples of the seal between second header 648 and second header receiver 650 may include, but is not limited to, a weld, a press fit, an adhesion, an elastomer o-ring, etc.

In some embodiments, first header 646 and/or second header 648 may not be in contact with a sense element. For example, second header 648 may be sealed to first header 646 but the sense element may only be in contact with first header 646. In other embodiments, the sense element may not be in contact with either first header 646 or second header 648. The sense element may be in contact with a connecting element configured to connect with the header assembly 600.

Figure 7:
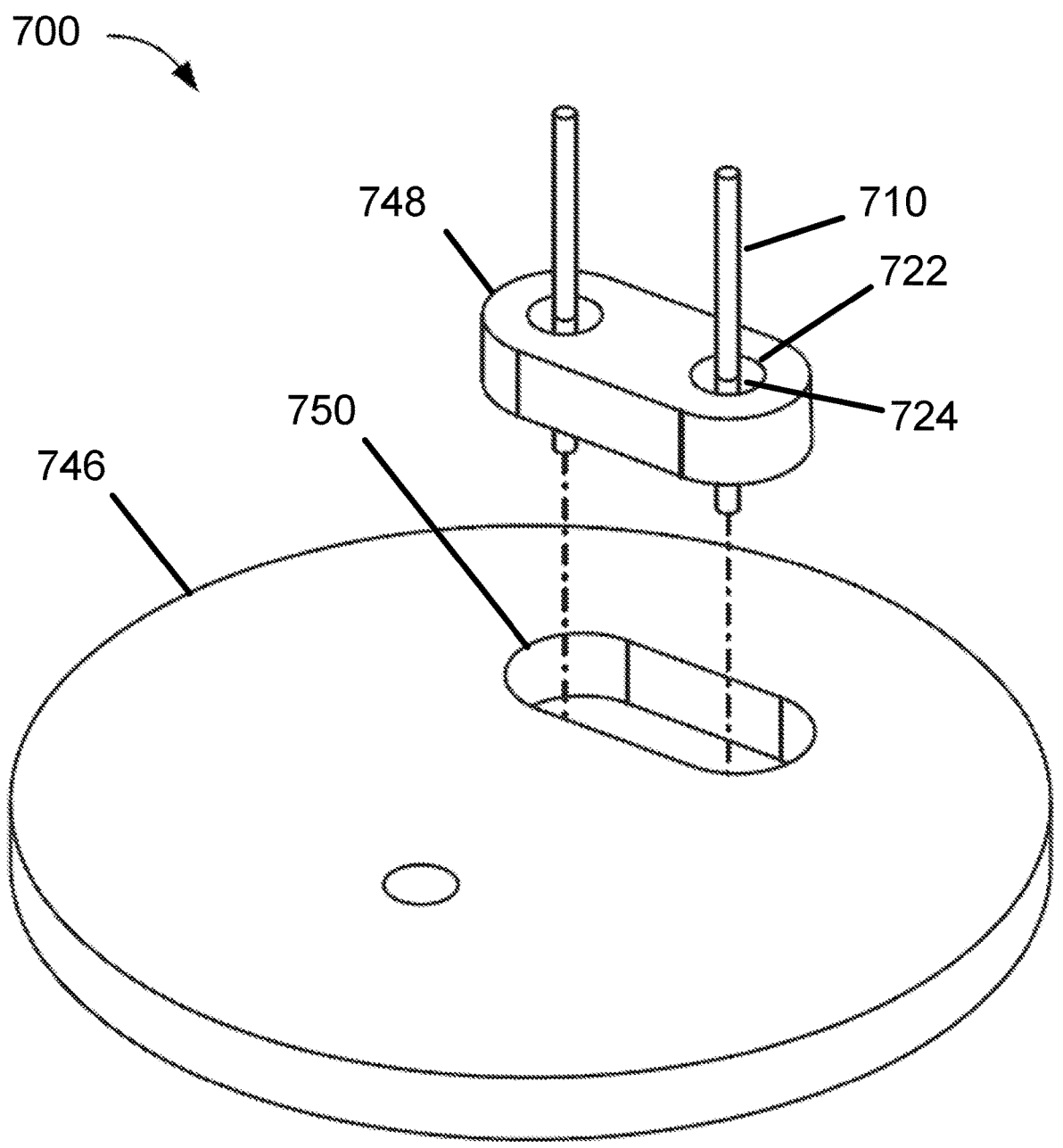
FIG. 7 illustrates a header assembly consistent with embodiments of the present disclosure.

Referring now to FIG. 7, a header assembly 700 consistent with embodiments of the present disclosure is provided. Header assembly 700 may include a first header 746 and a second header 748. In some embodiments, second header 748 may include a plurality of pins 710. The plurality of pins 710 may be configured to pass through second header 748 via a pin receiver 722. Pin receiver 722 may include a glass pin seal 724 and may include an edge of second header 748.

In some embodiments, each of the plurality of pins 710 may have their own respective pin receiver 722. For example, each of the plurality of pins 710 may be sealed to second header 748 by the glass pin seal 724 connected with pin receiver 722. In other embodiments, the plurality of pins 710 may be contained in one pin receiver 722. For example, not shown, a plurality of pins (e.g. pin 710) may pass through one pin receiver (e.g. pin receiver 722) and a glass pin seal (e.g. glass pin seal 724) may seal each of the plurality of pins within the one pin receiver. Accordingly, each of the plurality of pins may be insulated from each another in the one pin receiver.

In some embodiments, second header 748 may be connected to first header 746. First header 746 may include a second header receiver 750. Second header receiver 750 may include an edge of first header 746. Second header 748 may be sized to fit within second header receiver 750. Second header 748 may be connected to first header 746 by a connection with second header receiver 750. Other examples of the connection between first header 746 and second header 748, through second header receiver 750, may include, but is not limited to, a weld, a press fit, an adhesion, an elastomer o-ring, etc.

Figure 8:
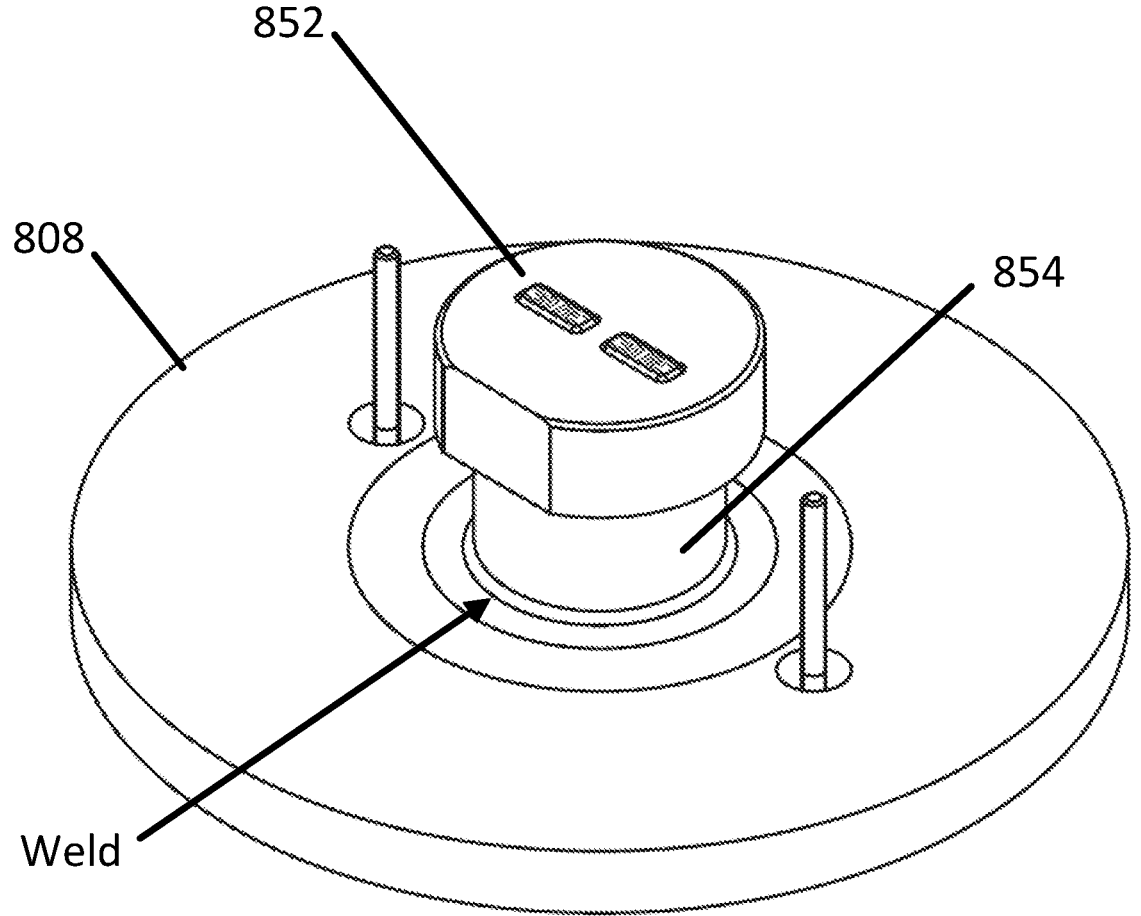
FIG. 8 illustrates a header and a sense element consistent with embodiments of the present disclosure.

Referring now to FIG. 8, a header 808 and a micro-fused strain gauge (MSG) style sense element 852 is provided consistent with embodiments of the present disclosure. In some embodiments, MSG style sense element 852 may be mounted to a tube 854. Tube 854 may be made from, but is not limited to, at least one of a metal tube, a glass tube, etc. In some embodiments, tube 854 may be welded to header 808. Accordingly, header 808, MSG style sense element 852, and tube 854 define a space accessible by the media, where the media may enter the space by the media receiver (not shown). Header 808, MSG style sense element 852, and tube 854 seal the space to prevent the media from entering the body. In other embodiments, tube 854 may be attached to header 808 with, for example but is not limited to, an elastomer o-ring, a gasket, etc.

FIG. 8 depicts an example embodiment of a one-piece header and tube. Accordingly, MSG style sense element 852 may be sealed to header 808. A media receiver (not shown) may be located on header 808 below tube 854 to allow the media to enter tube 854 and reach MSG style sense element 852. The media may be sealed in a space created by header 808, MSG style sense element 852, and tube 854.

Figure 9:
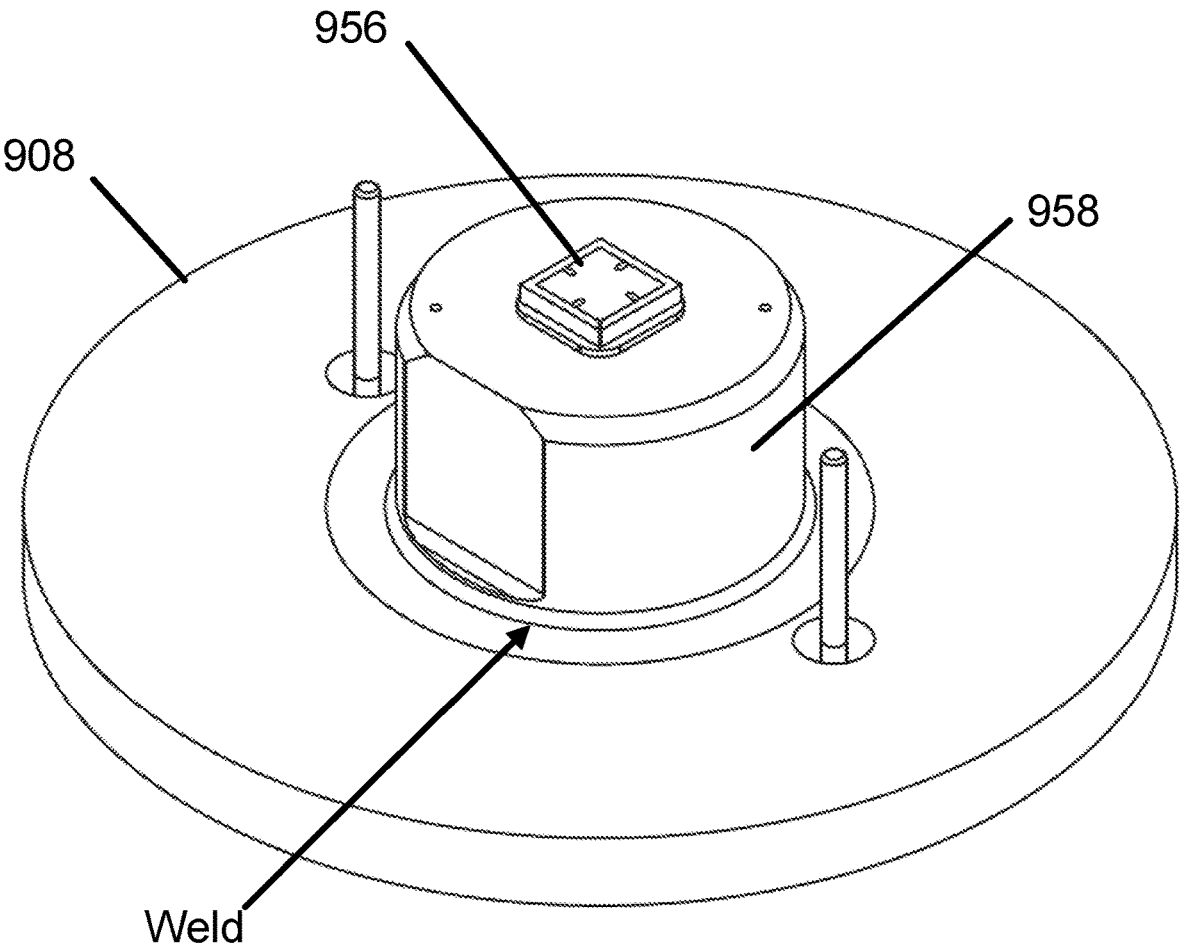
FIG. 9 illustrates a header and a sense element consistent with embodiments of the present disclosure.

Referring now to FIG. 9, a header 908 and a microelectromechanical systems (MEMS) style sense element 956 is provided consistent with embodiments of the present disclosure. In some embodiments, MEMS style sense element 956 may be mounted to a pedestal 958. In some embodiments, pedestal 958 may be securely attached to MEMS style sense element 956. Pedestal 958 may be connected to header 908 by, for example but is not limited to a weld. Pedestal 958 may be for example, but is not limited to, at least one of a metal pedestal and a glass pedestal. In some embodiments, pedestal 958 may be hollow, however, other configurations are also within the scope of the present disclosure.

Referring now to FIG. 10, a flowchart 1000 depicting a method of measurement with a pressure and temperature sensor consistent with embodiments of the present disclosure is provided. The method may include engaging 1002 a sensor housing with a component having media included therein, the sensor housing including a pressure port configured to receive the media and at least one thermistor, the sensor housing further including a body having a header and a sense element configured to seal the body from the media in the pressure port, wherein the header and the sense element define a space accessible to the media, wherein the header further includes a media receiver configured to allow the media to pass between the pressure port and the space, wherein the header further includes at least one pin in electrical communication with the thermistor and a pin receiver configured to accept the at least one pin, wherein the at least one pin is operatively connected to the pin receiver. The method may further include measuring 1004 an associated temperature with the thermistor and measuring 1006 an associated pressure with the sense element. Numerous additional operations are also within the scope of the present disclosure.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A pressure and temperature sensor comprising:
   a pressure port configured to receive a media, wherein the pressure port includes at least one thermistor; and
   a body including a sensor housing, a header and a sense element configured to seal the body from the media in the pressure port, wherein the header and the sense element define a space accessible to the media, wherein the header further includes a media receiver configured to allow the media to pass between the pressure port and the space, wherein the header further includes at least one pin in electrical communication with the thermistor and a pin receiver configured to accept the at least one pin, wherein the at least one pin is operatively connected to the pin receiver and;
   a first alignment component positioned above the header, and a second alignment component positioned below the header.

2. The pressure and temperature sensor of claim 1 wherein the sense element includes a first elastomer in contact with the header.

3. The pressure and temperature sensor of claim 2 wherein the first elastomer includes an o-ring seal.

4. The pressure and temperature sensor of claim 1 wherein the header is at least one of a metal and a ceramic.

5. The pressure and temperature sensor of claim 1 wherein the at least one pin seal is operatively connected to the pin receiver using a glass pin seal, wherein the glass pin seal is impenetrable by the media.

6. The pressure and temperature sensor of claim 5 wherein the glass pin seal is configured to allow an electrical signal to pass from the thermistor through the pin into the body of the sensor housing.

7. The pressure and temperature sensor of claim 1, wherein the first and second alignment components are configured to align the header and the sense element within the sensor housing.

8. The pressure and temperature sensor of claim 7, wherein the first and second alignment components are located in the pressure port.

9. The pressure and temperature sensor of claim 8, wherein the first and second alignment components are compressed inside the pressure port.

10. The pressure and temperature sensor of claim 7, wherein the first and second alignment components and a second elastomer are configured to seal the body from the media.

11. The pressure and temperature sensor of claim 7, wherein the first and second alignment components is a plastic.

12. The pressure and temperature sensor of claim 1, wherein the header and the pressure port is welded together, the weld is configured to seal the body from the media.

13. The pressure and temperature sensor of claim 1 wherein the sense element is a micro-fused strain gauge (MSG) sense element, the MSG sense element is attached to the header.

14. The pressure and temperature sensor of claim 13 wherein the MSG sense element is mounted to a metal tube and the metal tube is welded to the header.

15. The pressure and temperature sensor of claim 13 wherein the MSG sense element is mounted to a I-piece header and tube combination.

16. The pressure and temperature sensor of claim 1 wherein the sense element is a microelectromechanical system (MEMS) sense element, the MEMS sense element is mounted to a glass pedestal and the glass pedestal is mounted to the header.

17. The pressure and temperature sensor of claim 1 further comprising: a plurality of the pins connected to the header by a glass pin seal in the pin receiver, wherein each pin of the plurality of the pins are separated by the glass pin seal in the pin receiver.

18. The pressure and temperature sensor of claim 1 wherein the header includes a second header configured to fit within a second header receiver in the header, the second header includes the pin and a glass pin seal.

19. A method of measurement with a pressure and temperature sensor, the method comprising:

engaging a sensor housing with a component having media included therein, the sensor housing including a pressure port configured to receive the media and at least one thermistor, the sensor housing further including a body having a header and a sense element configured to seal the body from the media in the pressure port, wherein the header and the sense element define a space accessible to the media, wherein the header further includes a media receiver configured to allow the media to pass between the pressure port and the space, wherein the header further includes at least one pin in electrical communication with the thermistor and a pin receiver configured to accept the at least one pin, wherein the at least one pin is operatively connected to the pin receiver, wherein a first alignment component is positioned above the header and a second alignment component is positioned below the header; and measuring an associated temperature with the thermistor; and measuring an associated pressure with the sense element.

20. The method of claim 19, wherein the first and second alignment components are configured to align the header and the sense element within the sensor housing.

* * * * *